United States Patent [19]

Johnson et al.

[11] Patent Number: 4,632,751

[45] Date of Patent: Dec. 30, 1986

[54] SHAKER SCREEN

[76] Inventors: Louis W. Johnson; Bruce G. Johnson, both of 2435 Prairie Rd., Eugene, Oreg. 97402

[21] Appl. No.: 703,183

[22] Filed: Feb. 19, 1985

Related U.S. Application Data

[62] Division of Ser. No. 441,627, Nov. 15, 1982, Pat. No. 4,529,510.

[51] Int. Cl.[4] .......... B07B 1/34; B07B 1/36; F16H 33/00; B65G 27/20

[52] U.S. Cl. .......... 209/326; 209/329; 209/366.5; 209/412; 74/61; 74/87; 198/770

[58] Field of Search .......... 74/61, 87; 173/49; 198/770; 209/366, 366.5, 362, 364, 326, 329, 325, 412

[56] References Cited

U.S. PATENT DOCUMENTS

| | | | |
|---|---|---|---|
| 1,949,703 | 3/1934 | Wettlauter | 209/367 |
| 2,200,724 | 5/1940 | Robins | 74/61 |
| 2,238,711 | 4/1941 | Soldan | 209/326 |
| 2,860,783 | 11/1958 | Johnson | 74/87 |
| 2,884,790 | 5/1959 | Lehman | 209/366.5 |
| 2,922,309 | 1/1960 | Adams | 74/61 |
| 2,994,431 | 8/1961 | Becker | 209/367 |
| 3,442,381 | 5/1969 | Johnson . | |
| 3,473,396 | 10/1969 | Schwake | 74/61 |
| 3,768,647 | 10/1973 | Johnson | 209/364 |
| 4,165,655 | 8/1979 | Alford | 74/61 |
| 4,170,549 | 10/1979 | Johnson . | |
| 4,255,254 | 3/1981 | Faust | 74/61 |
| 4,285,405 | 8/1981 | Wier | 74/61 |
| 4,340,469 | 7/1982 | Archer | 209/367 |

FOREIGN PATENT DOCUMENTS

| | | | |
|---|---|---|---|
| 683947 | 10/1939 | Fed. Rep. of Germany | 209/326 |
| 299278 | 8/1954 | Switzerland | 209/366.5 |
| 781514 | 8/1957 | United Kingdom | 74/61 |

*Primary Examiner*—S. Leon Bashore
*Assistant Examiner*—Thomas M. Lithgow

[57] ABSTRACT

A screening basket has one or more screen decks and has upright side walls integrated with cross beams. A side beam, at approximately the center of gravity of the basket, is integrated with each of the side walls as well as with the cross beams to provide a unitary, rugged basket capable of vibratory movement on a support frame. A pair of cross shafts extend transversely of the screening basket and project beyond the side walls. These shafts are journaled in the side beams and have one projecting end geared together for opposite rotation. These projecting ends carry semi-circular eccentric weights of different mass to provide an oval vibratory stroke of the screening basket upon rotation of the shafts. Adjusting mechanism is provided to adjust the relative position of the weights on the shafts to vary the angle of stroke. These weights are arranged to receive auxiliary weights to vary the amplitude of vibratory stroke as well as the shape of the stroke.

4 Claims, 11 Drawing Figures

FIG. 5
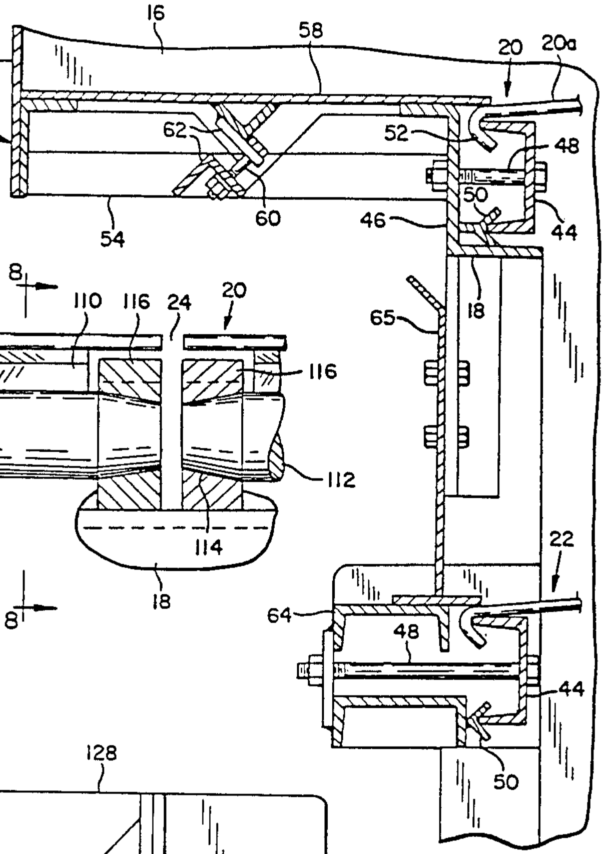
FIG. 7
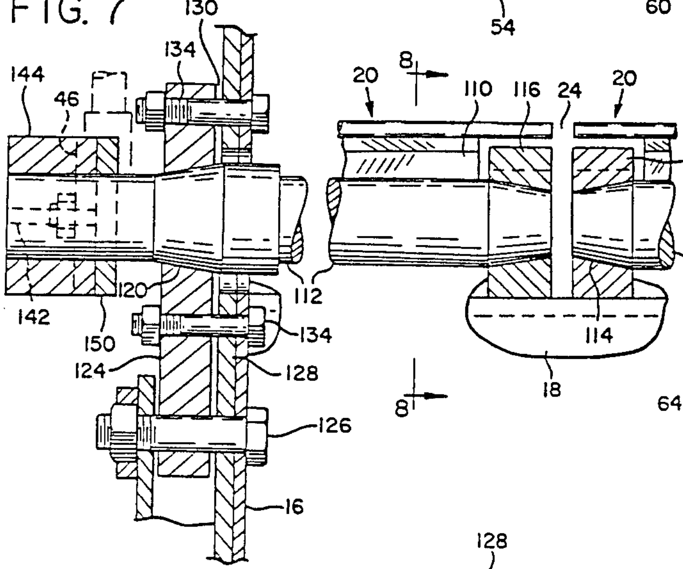
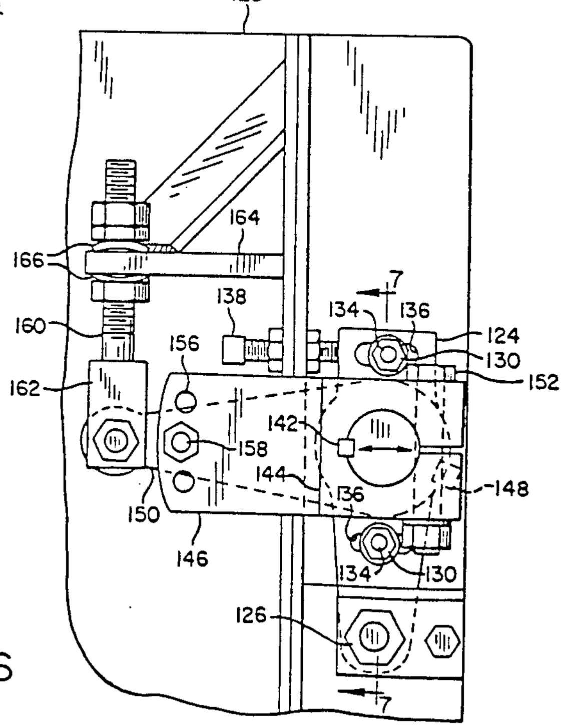
FIG. 6

SHAKER SCREEN

REFERENCE TO PRIOR APPLICATIONS

This application is a division of application Ser. No. 441,627, filed Nov. 15, 1982, now U.S. Pat. No. 4,529,510.

BACKGROUND OF THE INVENTION

This invention relates to new and useful improvements in shaker screens such as screens for screening rock.

Vibrating screen apparatuses have been extensively used for screening coarse mined rock material or crushed rock, and due to the heavy and abrasive nature of the material being screened, as well as the intense vibration required, various areas of research and improvement of the apparatus have been actively sought over prior devices. One such area comprises the making of a vibrating apparatus of the type described that has a most efficient load capacity and output since it is desired that the screen area for receiving and treating the material be maximum with relation to the dimensions of the apparatus. Also, improvements have been sought for attaching and detaching the screen deck since the intense vibration and abrasive action of the material thereon requires occasional repair or replacement. It is also desired that fast and easy repair or replacement of the deck or decks be accomplished to minimize downtime and costs. Still another area sought for improvement on this type of apparatus is in a screen cloth support deck that not only provides for fast and easy repair or replacement of the deck but also supports the screening surface for efficient slave operation with the driven screen basket. That is, heavy duty woven wire screens, in view of their open mesh and varying spacing of wires and relatively large gauge wire that forms their mesh, are difficult to support uniformly because wherever two wires cross, the screen is twice as thick as a space wire is. Heretofore this problem has not been satisfactorily accommodated. Not only is there lack of the slave operation of the screening, but also the non-uniformly supported screening surfaces whip and strike against their intended supports. This condition is very destructive and also unbearable in the noise generated. Costs become excessive and screening efficiency reduced. The present design corrects this problem.

Another area of research seeks to provide a frame and basket construction which will hold up under intense vibration and of course have minimum wear, and together with the vibrating source, be relatively simple and economical to manufacture.

SUMMARY OF THE INVENTION

According to the present invention and forming a primary objective thereof, a shaker screen apparatus is provided that forms substantial improvements over prior structures.

More particular objects of the invention are to provide a screen basket employing side walls and massive cross beams and side beams reinforcing the side walls to form a very strong vibrating frame; to provide the cross beams in spaced relation to reduce cycling stresses imposed on the side walls; to provide improved bearing support by means of the side beams; to provide shaft protective tubes that add further rigidity to the basket; and to provide side braces attached to the side beams and side walls that make an exterior perimeter bracing that is extremely rigid.

Another object is to provide a shaker screen apparatus that includes structure having an improved load capacity and output in that the screen support allows the screen deck to receive and treat a maximum amount of material with relation to the overall dimensions of the apparatus.

It is also an object to provide a support for the screen deck that facilitates precise slave operation with the driven screen basket to contribute to the efficiency of the output, and also to provide an arrangement facilitating the use of one or more screen sections and a support allowing ready attachment and detachment of deck sections. Still a further object is to provide screen sections and supports therefor which hold the screen sections in longitudinal arched configuration to minimize side wear and piling up of material at the sides.

A further object is to provide improved drive means for producing the vibratory action in that such drive means is simplified in operation and has adjustment means for readily adjusting the angle, amplitude, speed, and change of shape of the vibrating stroke.

Yet another object is to provide a vibrating basket arrangement wherein support bearings are exteriorly mounted relative to the side walls of the screen basket whereby to be located outside any path of movement of the material being screened and also to be readily available for maintenance and adjustment, as well as also to provide rugged bearing support for the vibrating drive.

For the purpose of carrying out the objectives of the invention, a screen basket capable of vibrating movement on a base frame employs massive cross beams and side beams as well as other reinforcement means to provide a unitary and rugged unit. This basket includes transverse means for end fastening of one or more screen deck sections, thus eliminating side fastening elements to have the advantage of providing an enlarged screening area in relation to the overall dimensions of the apparatus. Longitudinally extending pivotally adjustable bars are provided on the side walls of the basket that support pairs of cross members, and such cross members are adjustable with the bars to precisely conform to the contour of the underside of the screen to insure full engageable long wearing support of the screen and to provide precise slave movement of the screen with the basket. A novel arrangement of impulse weights for accomplishing the vibratory movement as well as the operative securement to the screen basket are provided, such arrangement being simplified in structure and at the same time providing a vibratory action that can readily be adjusted as to angle, amplitude, speed and shape of stroke. The impulse weights are enclosed in casings which form an integral part of the side beams.

The invention will be better understood and additional objects and advantages will become apparent from the following description taken in connection with the accompanying drawings.

BRIEF DESCRIPTION OF THE DRAWINGS

FIG. 5 is an enlarged fragmentary sectional view showing screen deck attaching and tensioning means at the load end of the screen deck, this view being taken on the line 5—5 of FIG. 1;

FIG. 6 is an enlarged fragmentary elevational view showing screen tensioning means at the other end of the screen deck, this view being taken on the line 6—6 of FIG. 1;

FIG. 7 is a fragmentary sectional view taken on the line 7—7 of FIG. 6;

DETAILED DESCRIPTION OF A PREFERRED EMBODIMENT

Figure 1:
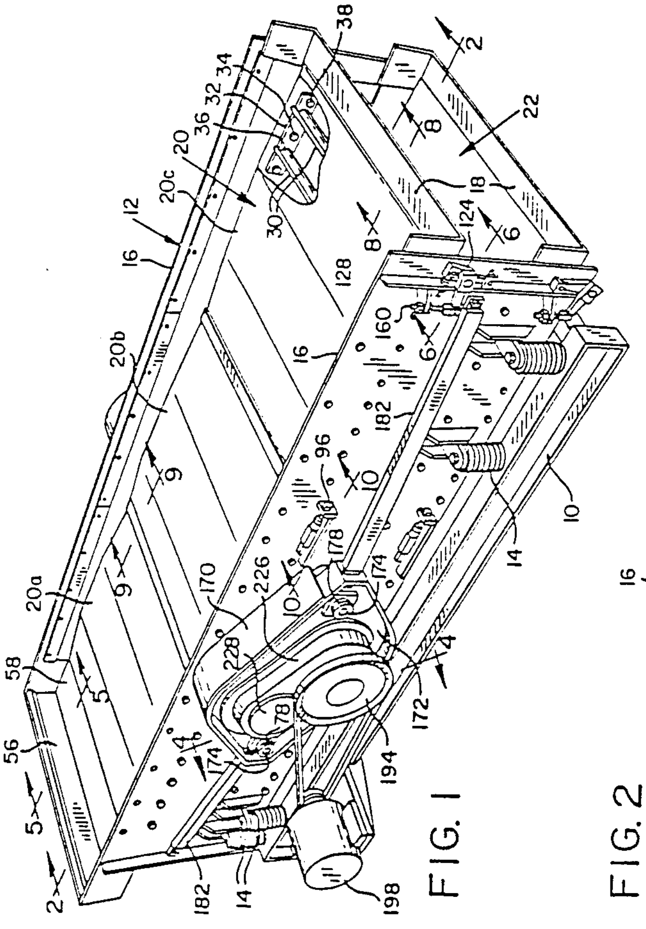
FIG. 1 is a perspective view of a shaker screen apparatus embodying features of the instant invention.

Referring first to FIG. 1, the shaker screen apparatus includes a base frame 10 which supports a screen basket 12 capable of vibrating movement by conventional support means 14 such as springs. The screen basket has parallel upright heavy duty side walls or plates 16 formed into an integral unit by suitable cross frame members 18. The screen basket of FIG. 1 is illustrated as having two decks 20 and 22, although it is to be understood that the invention herein is applicable to more or less decks. The upper deck is disposed a short distance below the top edge of the side walls to form a trough for the material on this deck. The two decks have substantially identical construction and reference herein will be to the upper deck alone. Each deck, as will be more apparent hereinafter may be divided down the middle with a small space 24 therebetween, FIG. 7.

Figure 2:
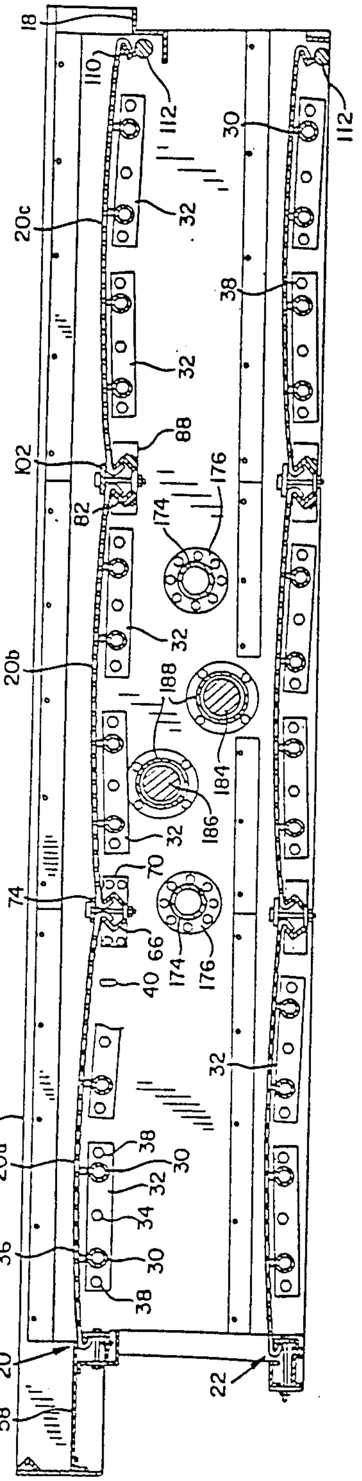
FIG. 2 is an enlarged vertical sectional view taken on the line 2—2 of FIG. 1; this view being partly diagrammatic.

As a part of the present invention and with reference also to FIG. 2, deck 20 is formed of a plurality of longitudinal sections of mesh screen 20*a*, 20*b* and 20*c*. As will now be apparent, these screen sections are supported across their full widths by beams or cross members 30 and have clamping engagement at their ends with each other and the basket by releasable clamping and tensioning means to be described.

Figure 8:
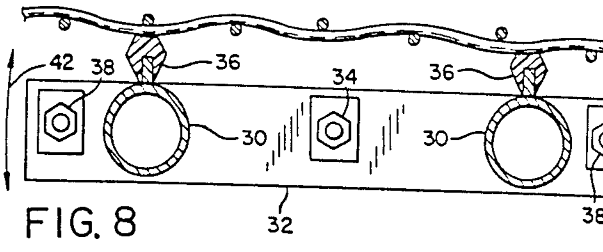
FIG. 8 is a fragmentary sectional view taken on the lines 8—8 of FIG. 1.
Figure 8:
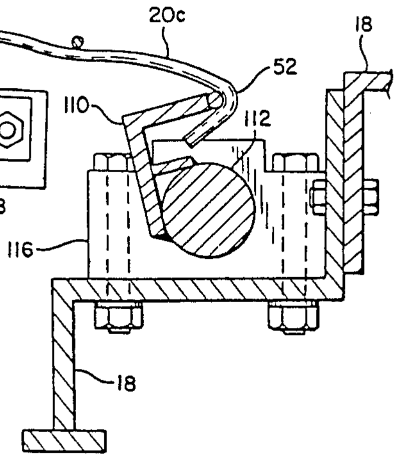

The supports for beams 30 comprise two end bars or rocker arms 32 for each section, one of such end bars also being shown in FIG. 8. Each of these end bars is elongated and has a central pivot support 34 on its side wall 16. Cross beams 30 have crown strips 36 formed of metal or an elastomer material on which the screen sections are supported. The end bars 32 have a bolt 38 at each end which passes through a hole 40, FIG. 2, in the side plates 16. These bolts are arranged upon tightening to hold the end bars in a fixed adjusted position on their pivots. Holes 40 are vertically elongated whereby upon loosening the bolts 38, the end bars can be rotatably adjusted, as shown by the arrows 42 in FIG. 8, so that the screen can have a two point support at each end bar and thus a multiple supporting engagement with the underside of the screen sections. More particularly, if a screen is supported on rigid supports, the mesh construction thereof may cause portions of the screen to span over the support members whereby the screen will not precisely have slave movement with the basket and will rattle as well as quickly wear. However, with the adjustable arrangement of the supporting elements 30, the latter can be positioned so that each of its two points of support can be brought into engagement with the underside of the screen. This series of end bars thus provides multiple and positive engagement of the screen sections whereby there will be no unsupported areas to whip against intended supports. The end bars 32 are arranged such that the screen sections are slightly arched from end to end.

Clamping and tensioning means for the screen sections are provided at the opposite ends of the screen basket as well as at intermediate points and will now be described. Such means at the load end of the shaker screen, namely, the left side of FIGS. 1, 2, and 5, comprises half-width channel-shaped tension bars 44 attached to an end wall portion 46 of the screen basket 12 by a plurality of bolts 48 spaced across the end. The flange portions of the bars 44 face outwardly toward the wall portion 46 and are spaced therefrom. Wall portion 46 has a transverse V-projection integral therewith arranged for pivoted engagement by the end of the bottom flange of the bars 44. The ends 52 of the longitudinal wires of the mesh sections 20*a*, and the other sections as well, are crimped downwardly at an angle less than 90 degrees and hook over the top flange of the bars 44. It is thus apparent that upon threaded adjustment of tensioning bolts 48, bars 44 can be pivoted in the projection 50 for tightening or loosening the screen sections 20*a*. The load end of the basket for the upper deck includes an integral extension frame 54 having an end wall 56 for confining, together with side walls 16, material deposited on the apparatus. Extension 54 supports a floor plate 58 which at its inner end overlaps the adjacent end of the screen segment 20*a*. This floor plate has removable attachment to the extension 54 by bolts 60 engageable with cross frame members 62 on each of the extension and floor plate and serves to hold the crimped ends 52 in locked position.

Similar tensioning clamp bars 44 and bolts 48 are provided for this end of the lower screen deck, but such bars are associated with transverse frame members 64 on the basket instead of the infeed extension 54. A removable and vertically slidable end gate 65 is mounted at the feed end between the screen decks to prevent spillage.

Figure 9:
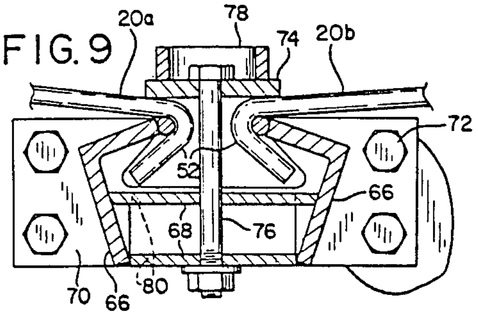
FIG. 9 is an enlarged fragmentary sectional view showing intermediate screen-deck attaching means, this view being taken on the line 9—9 of FIG. 1.

With reference to FIG. 9, clamp means at the other or inner end of the screen sections 20*a* comprises a pair of angle iron clamp bars 66 integrated with each other in a channel-like construction by connecting webs 68. This channel-like member has integral end plates 70 secured to the side walls of the basket in a stationary position as by bolts 72. The upper flanges of bars 66 face each other and are arranged to have hooked engagement by crimped ends 52 of the longitudinal wires of screen sections 20*a* and 20*b*. A cap strip 74 is clamped over the ends of the screen sections by several spaced vertical bolts 76 extending through this strip and through connecting webs 68. The heads of bolts 76 are protected by hardened projecting bosses 78 integral with the strip 74. Connecting webs 68 have suitably spaced holes 80 therein to allow stray material to self eject.

Figure 10:
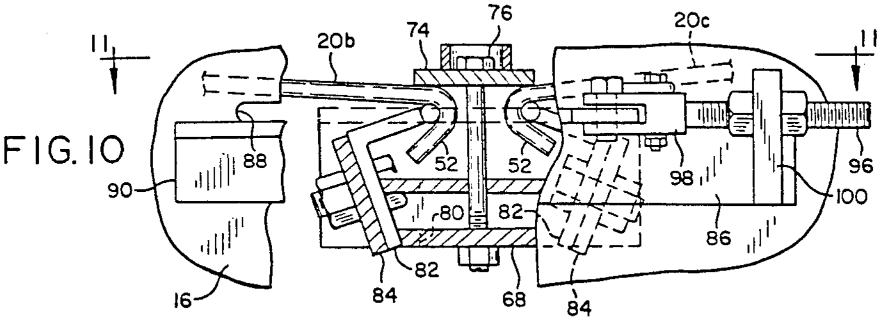
FIG. 10 is an enlarged fragmentary elevational view also showing intermediate screen deck attaching and tensioning means, this view being taken on the line 10—10 of FIG. 1 and being partly broken away.
Figure 11:
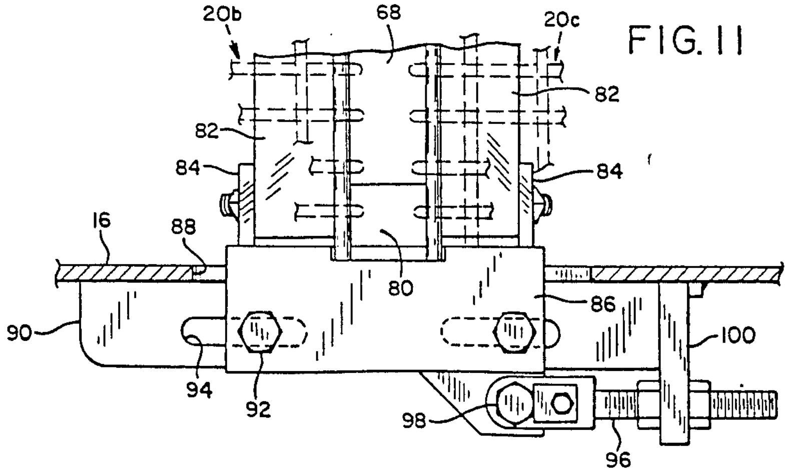
FIG. 11 is a fragmentary plan view taken on the line 11—11 of FIG. 10.

The screen clamp assembly between the sections **20*b* and 20*c* is detailed in FIGS. 10 and 11 and includes tension means as a part thereof. Such assembly comprises angle iron clamp bars 82 integrated by connecting webs 68 in a channel-like construction similar to the structure of FIG. 9. This channel-like member has bolted connection to inwardly projecting ears 84 integral with a right angle slide plate 86 on each side of the basket. Similar to the clamp bars 66, the bars 82 are angled for hooking engagement by crimped ends 52 of the screen sections 20*b* and 20*c*. Slide plates 86 extend through slots 88 in the side walls 16 of the basket and ride on outwardly extending flanges 90 integral with the side walls 16 at the slots 88. Slide plates 86 carry anchor bolts 92 engageable in elongated slots 94 in the flanges 90. Longitudinally extending shackle bolts 96 have a clevis connection 98 with the slide plates 86 and have adjustable engagement with laterally extending ears 100 on the side walls 16. By adjustment of the bolts 96, the clamp plates 86 and this clamp bars 82 can be adjusted longitudinally of the basket. A cap strip 74 is clamped on the ends of the screen sections 20*b* and 20*c* by bolts 76 as in FIG. 9. These cap strips close the open area between the bars 82 and also hold the screen ends down. Webs 68 similarly have holes 80 to eject any material that enters the area between the bars 82**.

Clamp means for the screen deck sections **20*c* at the discharge end of the basket is shown in FIGS. 6, 7 and 8. Such clamp means not only has means for longitudinally tensioning this deck section but also has means for adjusting to any misalignment in this screen section. It includes half width angle iron levers 110 integral with shafts 112 that have pivot support 114 at their inner ends in conical pivot bearings 116 secured to a cross frame member 18 of the basket. Angle iron levers 110 have one of their flanges angled upwardly for hooking engagement with the crimped ends 52 of the discharge end of screen sections 20*c***.

The outer ends of shafts 112 have a tapered fit 120 with upright pivot bars 124 having pivot supports 126 on upright reinforcing frame members 128 integral with the basket. Pivot bars 124 have an adjustable non-rattling fit on their tapers 120 of shafts 112 by upper and lower take-up bolts 134 supported in side wall portions of the screen basket and passing freely through longitudinally elongated slots 136 in the bar 124. The parts are arranged such that a gap remains between the pivot bars and the members 128 to allow the desired take-up. Set screws 138 are threadedly mounted in the frame member 128 and have end abutment with a side edge of the upper end of the pivot bars 124.

The shafts 112 project at their outer ends past the bars 124 and have key connections 142 with square hubs 144 of main adjusting lever arms 146. Auxiliary adjusting lever arms 150 are rotatably supported on the shaft extension against the inner side of the main lever arms 146 and are retained laterally against these arms by right angle retainers 148 integral with arms 146.

Main lever arms 146 have a split construction at their hubs and are clamped on the shaft extensions by bolt means 152. Such main lever arms have locked adjustable positions with the auxiliary lever arms 150 by a series of holes 156 in such main lever arm. One of such holes is arranged for selected alignment with a single hole, not shown, in the auxiliary lever arms 150 and engageable by bolts 158. Bolts 158 provide for rough adjustment between the lever arms 146 and 150. Final tensioning adjustment is accomplished by the setscrews 138 and by shackle bolts 160 having clevis connections 162 with the free ends of auxiliary lever arms 150 and threadedly engaged in flanges 164 integral with the frame members 128. Shackle bolts 160 are secured in enlarged bores in the flanges 164 and are free to pivot by means of convex washers 166 on opposite sides of flanges 164.

The clamp and tensioning assemblies just described are, as stated above, arranged to tension the screen sections **20*c* as well as to adjust to any misalignment of these sections. That is, with hooked engagement of the crimped ends of screen sections 20*c* over the angle iron levers 110 and with the setscrews 138 backed off, the levers 110 and their shafts 112 can be adjusted through their lateral length to the lateral alignment of the end of screen sections 20*c*, the shackle bolts 160 also being backed off at this time, namely, adjusted downwardly, and also a proper rotative adjustment being made for the lever arms 146 and 150 by bolts 158. The levers 110 and shafts 112 can be adjusted rotatably so as to move the inner ends of the levers into engagement with the crimped ends 52 of their respective inner ends of the screen sections 20*c*. Then the outer ends of the lever assemblies are adjusted by movement on their pivots 126 to bring the outer ends of levers 110 dead parallel with the crimped ends 52. The workman can initially tighten the deck section 20*c* by a lever wrench engaged with the square hub 144 of the lever arms 146, and thereupon, forceful tensioning of the screen sections 20*c* is accomplished by adjustment of setscrews 138 and shackle bolts 160. Rough adjustment for the auxiliary lever arm 150 is first made by means of the adjusting bolt 158 in a selected hole 156 in the main lever arm 146, and the only time that the bolts will be moved to the outer holes 156 is if deck sections 20*b* or 20*c* are formed too long or short for adjustment by bolts 160**.

In the installation of a screen deck, the screen sections **20*a* are installed between the tension bars 44 and the associated clamp bars 66. Tensioning of these screen sections is by means of bolts 48. Screen sections 20*b* are then connected between associated clamp bars 66 and clamp bars 82 and adjustment for connection and tensioning of screen sections 20*b* are accomplished by shackle bolts 96. The clamp bars 82 can accommodate misalignment of the screen sections associated therewith. Screen sections 20*c* are then installed between their associated clamp bars 82 and the end adjusting structures of FIGS. 6, 7, and 8 which, as explained, not only are available by means of the lever arm assemblies 146, 150 to apply the desired tensioning to these screen sections but also are adjustable to any misalignment that may result in the installation or tensioning of the screen sections by pivot bars 124**.

Figure 4:
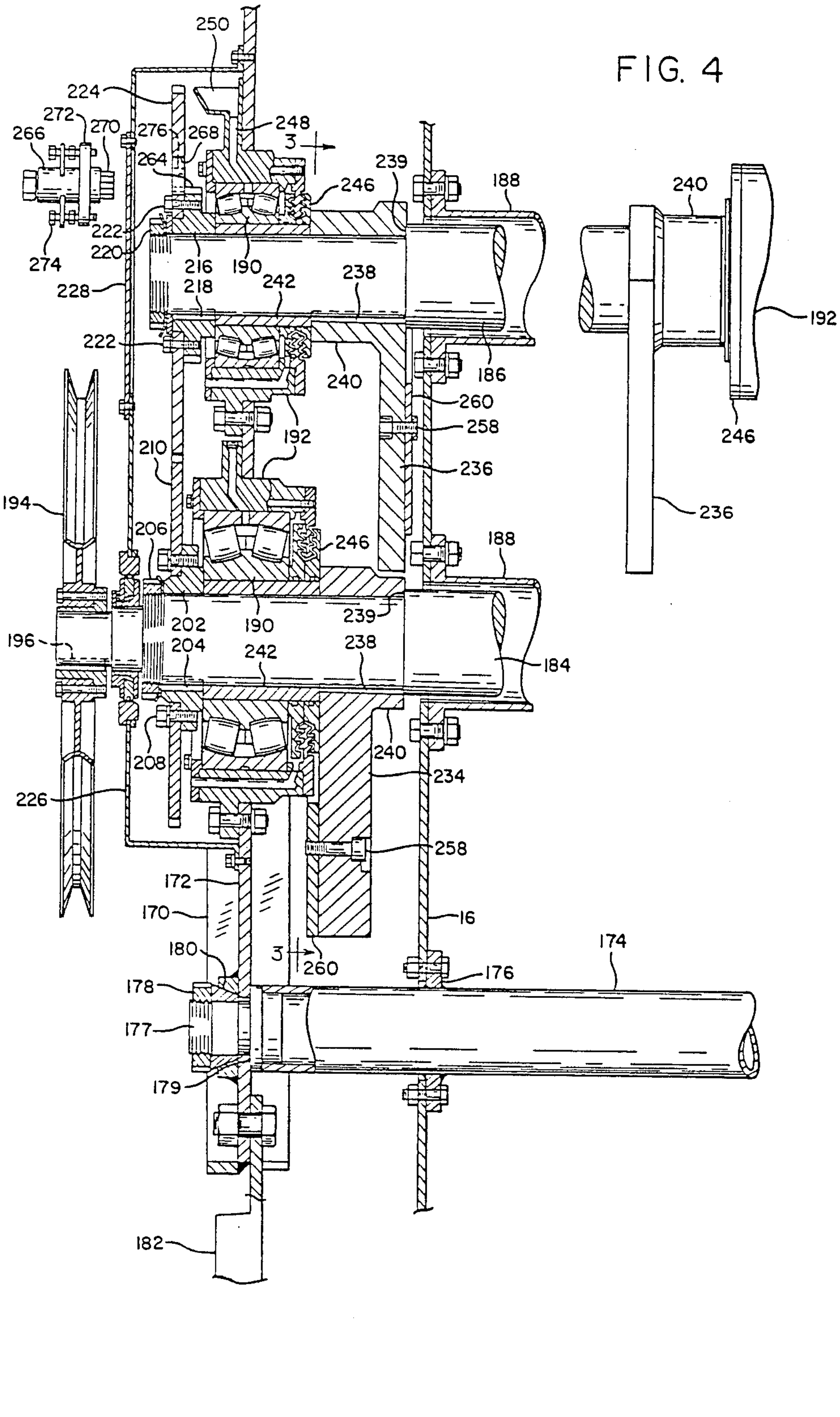
FIG. 4 is a fragmentary enlarged sectional view taken on the line 4—4 of FIG. 1 and showing the impulse drive means for producing the vibratory movement.

With particular reference to FIGS. 1 and 4, mechanism for imparting vibratory movement to the screen basket 12 comprises beams 170, one on each side, and each comprising a housing of somewhat a rhombus shape. These beams also have a longitudinal, vertical, full area central wall or plate 172 integral therewith to form a massive structure. Two very strong tubular cross-bars 174 are spaced apart at a convenient distance to accommodate the design lengths of beams 170. Bars 174 have integral flanges 176 adjacent their ends which are bolted to side walls 16 of the shaker screen. The ends of bars 174 have reduced diameter stub extensions 177 welded thereto arranged to receive split conical ring and large nut assemblies 178. Walls 172 are drilled to receive these stub extensions and bear against shoulders 179 of the bars. The outer faces of walls 172 have concentric tapered holes 180 to the drilled holes for the ends of the cross bars. The tapered rings of the nut assembly 178 are inserted into the tapered holes 180 and the large nuts are capable of forcing the tapered rings inward and very tightly into the tapered holes in the walls 172. The results are an extremely rigid assembly that resists vibrating forces and also one that is easy and quick, to assemble and disassemble.

Longitudinal sway braces 182 are secured at one of their ends to the beams 170 and to their other or outer ends to the ends of the side walls 16. These braces ends of the vibrating basket 12 and prevent destructive side flexing of the side walls 16. These sway braces also assist in maintaining uniform motion throughout the whole assembly. They are outside the falling material and free of wear.

A pair of shafts 184 and 186, FIG. 4, extend transversely of the basket through' cylindrical protecting tubes 188 bolted to the basket side walls. These shafts project into the beams 170 and have journaled support in walls 172 of the beams 170 by spherical roller bearings 190 in bearing carriers 192 bolted to walls 172. Shaft 184 projects laterally outward from the beams 170 and has a driven pulley 194 connected thereby by a key connection 196. Pulley 194 has a belt drive connection to a variable pitch pulley mounted on a motor 198, such as an electric motor, supported on the frame 10. The drive motor 198 and its base are designed to mount on either side and the shaft 184 is machined to have the driven sheave mounted at either end.

A gear hub 202 has a key connection 204 on the shaft 184, and this hub is held on the shaft by an end nut 206. Hub 202 has a cap screw connection 208 to a gear 210. A gear hub 216 has a key connection to shaft 186, and this hub is held on the shaft by an end nut 220. Hub 216 has a cap screw connection 222 to a gear 224 in mesh with gear 210. As apparent, shafts 184 and 186 rotate in opposite directions. Walls 172 include front covers 226 removably bolted thereto, and the gear driven side has an access plate 228 bolted thereto in the area of the end of shaft 186.

Figure 3:
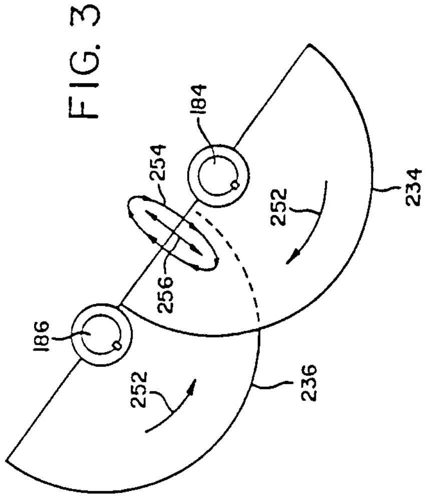
FIG. 3 is a diagrammatic view of impulse drive means for accomplishing the vibratory movement, this view being taken on the line 3—3 of FIG. 4.

Shafts 184 and 186 are disposed in different planes and support semi-circular impulse or eccentric weights 234 and 236, respectively, also seen in FIG. 3, on each side of the basket for balanced action. These weights have key connections 238 on the shafts. Hubs 240 on the weights 234 and 236 face in opposite directions in a compact arrangement and are dimensioned such that the weights 234 and 236 clearly pass each other in their opposite directions of rotation. The hubs of the impulse weights are held against shoulders 239 of shafts 186 and 184 by bushings 242 which are press fitted to their respective shafts. The casings 226 house oil for lubrication, and labyrinth seals 246 are included on the shafts to retain the lube oil and exclude contaminants. Bearing housings 192 also include oil passageways 248 as well as catch basins 250 which catch oil that is thrown by the gears and which direct the oil into these passageways.

Impulse weights 234 are heavier than their respective impulse weights 236 and due to the opposed rotation of the shafts, as designated by the arrows 252 in FIG. 3, and also due to the relative vertical position of the shafts, provide an oval vibrating stroke for the screen basket. An oval stroke 254, FIG. 3, is provided in approximately the shape and angle shown when the weights have a mass relationship with the weights 234 twice as heavy as weights 236 and with the weights similarly positioned, namely, with their flat edges capable of parallelism in one phase relationship of the weights. In the arrangement shown, the oval vibrating action, as shown by the arrows 256 in FIG. 3, advances the material to the right as viewed in FIGS. 1, 2 and 3. Such oval action also minimizes the possibility of rocks becoming lodged in the screen mesh. The weights 234 and 236 may be switched on the shafts to meet certain design requirements.

With reference to FIG. 4, the weights 234 and 236 have cap screw means 258 arranged to secure extra weights 260 thereon. These extra weights can be installed to change the amplitude of vibration forces, namely, the heavier the weights the longer the major axis of the oval stroke 254. The shape of the stroke can be changed by changing the relative mass of weights 260. As an example a wider oval will result when the mass of impulse weights 234 is increased in proportion to the mass of impulse weights 236. Likewise, a lessening of the mass on impulse weights 234 will decrease the width of the oval stroke.

The speed of vibration is controlled by the variable pitch pulley on motor 198.

The angle of stroke 254 is changed by varying the relative position or phase relationship of the pair of impulse weights on their shafts. For example, to make the stroke more vertical, the crank wrench is turned counterclockwise, FIG. 3. Conversely, clockwise turning of the wrench makes the stroke more horizontal.

For the purpose of adjusting the two weights in the pairs in their relative phase relationship, the slave shaft 186 is capable of release from the drive shaft 184. To accomplish this feature, hub 216 of gear 224 has auxiliary gear teeth 264 which upon engagement by an adjusting gear unit 266 and removal of screws 222, can have adjusting rotation relative to gear 224. Gear 224 has a hole 268 to provide access for adjusting gear unit 266. Adjusting gear unit 266 has a toothed end 270 for temporary meshing engagement with the teeth 264 and furthermore has a body portion 272 with a pair of screws 274 thereon arranged for engagement with a pair of selectively located screw holes 276 tapped in gear 224 one on each side of hole 268. Thus, to change the position of impulse weight 236 relative to impulse weight 234 so as to change the angle of stroke as above noted, the cover plate 228 is first removed. This will expose the gear 224 and the hole 268 therein as well as a pair of the attaching holes 276 adjacent the hole 268. The adjusting gear unit 266 is then inserted into hole 268 for meshing engagement of its toothed end 270 with the gear teeth 264 on the hub 216. The two screws 274 on the wrench are then threaded into the two screw holes 276 adjacent the hole 268 just tight enough to bring the body portion 272 against the face of the gear 224. The hex end of adjusting gear unit 266 is then engaged by a box wrench and held against rotation by such box wrench while screws 222 are removed. Thereupon by rotation of the box wrench, the gear 224 is turned relative to the hub 216 to selectively position the phase relationship of the two impulse members 234 and 236. All the screws 222 can then be reinserted. Gear 224 and hub 216 have a series of matching holes for the screws 222 to provide any useful degree of rotative adjustment.

In summary, the shaker screen apparatus of the invention provides a structure that allows fast and easy installation and replacement of the screen decks. Also, the clamp means for the screen deck sections accommodate misalignment of the sections and this feature in combination with the pairs of supports 30 provide positive support and engagement of the sections so that they will remain in long wearing clamped engagement and will follow precisely the vibrating movement of the basket frame. Furthermore, the end clamping of the sections, rather than previous side clamping, greatly increases the screening area relative to the overall size of the deck. Furthermore, the longitudinal arching of the sections provides substantial uniform distribution on the screen deck and does not cause material to pile up at the sides. Stock width rolls of woven wire screens can be used without side crimping to form side hooks for side to side tensioning which reduces screen area.

The apparatus utilizes a simplified two shaft arrangement to provide the oval stroke vibration. The two impulse shafts are centered for location at the longitudinal center of gravity of the screen basket which has many advantages over end or top drives. The housings 170 and their unitary integration with the screen basket by widely spaced cross bars 174 as well as by sway bracing arms 182 provide a rugged vibrating assembly. Also, the parts under the screening area are easily replaced when worn.

Another feature of the invention is the simplified arrangement of the impulse weights 234 and 236 and the ease of adjustment to vary the angle, amplitude and change of shape of the oval shape. The bearings 190 are outside the impulse weights for greater operating stability and further facilitate bearing changing.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A vibrating screen apparatus comprising a support frame;

a screening basket mounted on said support frame for vibratory movement and having opposite ends and sides, said screening basket having upright side walls;

a screening deck on said basket;

a pair of cross bars extending through said screening basket and having cross bar ends projecting outwardly from the sides thereof;

means securing said cross bars to said screening basket for providing an integral vibrating unit;

side beam means on both sides of the basket comprising a rhombus shaped central plate extending parallel to and spaced from the side wall, a peripheral wall formed integral with said central plate and extending around the periphery of said central plate and longitudinal sway braces secured between the peripheral wall and the ends of said basket;

means securing the central plate to the projecting ends of said cross bars also in an integral vibrating unit with said cross bars and screening basket;

a pair of tubes extending between said screen basket side walls;

a pair of cross shafts, each shaft within one of said tubes, extending through said screening basket and projecting beyond at least one side wall of said screening basket, journeled support means connected to said central plate for supporting said cross shafts;

a pair of gears on said projecting end of said pair of shafts meshing together to provide opposite rotation of said shafts;

power means driving said shafts;

and a disc-like weight secured to each of said shafts, said weights being semi-circular in shape and being of different mass to provide an oval vibrating stroke to said screening basket upon rotation of said shafts.

2. The vibrating screen apparatus of claim 1 wherein said means securing said cross bars to said screening basket comprise integral flanges on said cross bars, and bolt means bolting said flanges to said screening basket.

3. The vibrating screen apparatus of claim 1 wherein one of said gears in said pair of meshing gears includes auxiliary gear teeth to provide adjusting rotation of its shaft relative to the other shaft for changing the relative positioning of said weights.

4. The vibrating screen apparatus of claim 1 wherein one of said gears in said pair of meshing gears includes auxiliary gear teeth to provide adjusting rotation of its shaft relative to the other shaft for changing the relative positioning of said weights, and toothed adjusting means engageable with said auxiliary gear teeth for providing said adjusting rotation.

* * * * *